(12) United States Patent
Hasegawa et al.

(10) Patent No.: US 12,333,743 B2
(45) Date of Patent: Jun. 17, 2025

(54) DATA PROCESSING APPARATUS, DATA PROCESSING METHOD, AND COMPUTER READABLE MEDIUM

(71) Applicants: Mitsubishi Electric Corporation, Tokyo (JP); THE UNIVERSITY OF TOKYO, Tokyo (JP)

(72) Inventors: Takefumi Hasegawa, Tokyo (JP); Yohei Okato, Tokyo (JP); Takeshi Oishi, Tokyo (JP); Ryoichi Ishikawa, Tokyo (JP)

(73) Assignees: MITSUBISHI ELECTRIC CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 111 days.

(21) Appl. No.: 18/221,472

(22) Filed: Jul. 13, 2023

(65) Prior Publication Data

US 2023/0360236 A1 Nov. 9, 2023

Related U.S. Application Data

(63) Continuation of application No. PCT/JP2021/008985, filed on Mar. 8, 2021.

(51) Int. Cl.
*G06T 7/292* (2017.01)
*G01S 17/42* (2006.01)
(Continued)

(52) U.S. Cl.
CPC ............ *G06T 7/292* (2017.01); *G01S 17/42* (2013.01); *G01S 17/931* (2020.01); *G06T 7/80* (2017.01);
(Continued)

(58) Field of Classification Search
CPC ................ G06T 7/292; G06T 7/80; G06T 2207/10028; G06T 2207/30244;
(Continued)

(56) References Cited

U.S. PATENT DOCUMENTS 7,263,209 B2 * 8/2007 Camus ................. G06T 7/593
382/104
10,468,062 B1 * 11/2019 Levinson ............... G01S 7/497
(Continued)

FOREIGN PATENT DOCUMENTS

JP 2016-223963 A 12/2016
JP 2018-96715 A 6/2018
(Continued)

OTHER PUBLICATIONS

International Search Report for PCT/JP2021/008985 mailed on Jun. 8, 2021.
(Continued)

*Primary Examiner* — Timothy R Newlin
(74) *Attorney, Agent, or Firm* — Birch, Stewart, Kolasch & Birch, LLP

(57) ABSTRACT

A camera movement amount acquisition unit (101) acquires as a camera movement amount (110), an estimated movement amount of a vehicle (10) calculated using photographed image data acquired by, a camera (20) installed on the vehicle (10). In synchronization with the acquisition of the camera movement amount (110) by the camera movement amount acquisition unit (101), a LiDAR movement amount acquisition unit (102) acquires as a LiDAR movement amount (120), an estimated movement amount of the vehicle (10) with higher estimation accuracy than estimation accuracy of the camera movement amount (110). A comparison decision unit (103) compares the camera movement amount (110) with the LiDAR movement amount (120), and
(Continued)

decides to use the camera movement amount (110) for a calibration operation when a difference between the camera movement amount (110) and the LiDAR movement amount (120) is less than a threshold value.

11 Claims, 10 Drawing Sheets

(51) Int. Cl.
  *G01S 17/931* (2020.01)
  *G06T 7/80* (2017.01)
  *H04N 17/00* (2006.01)

(52) U.S. Cl.
  CPC . *H04N 17/002* (2013.01); *G06T 2207/10028* (2013.01); *G06T 2207/30244* (2013.01); *G06T 2207/30252* (2013.01)

(58) Field of Classification Search
  CPC ........... G06T 2207/30252; G01S 17/42; G01S 17/931; G01S 7/4972; G01S 17/86; G01S 17/89; H04N 17/002; H04N 23/60
  See application file for complete search history.

(56) References Cited

U.S. PATENT DOCUMENTS

| | | | |
|---|---|---|---|
| 10,916,035 B1* | 2/2021 | Kroeger | G05D 1/0212 |
| 11,460,855 B1* | 10/2022 | Lim | G05D 1/024 |
| 11,479,213 B1* | 10/2022 | Kentley-Klay | G01S 17/931 |
| 2014/0368615 A1* | 12/2014 | van Baar | G01S 17/894 |
| | | | 382/154 |
| 2015/0192439 A1* | 7/2015 | Mihelich | G01D 18/00 |
| | | | 702/104 |
| 2018/0147998 A1* | 5/2018 | Ohtomo | G05D 1/0094 |
| 2018/0267142 A1 | 9/2018 | Motoyama et al. | |
| 2018/0372841 A1 | 12/2018 | Hieida et al. | |
| 2019/0132573 A1* | 5/2019 | Shintani | G06T 7/55 |
| 2021/0033712 A1 | 2/2021 | Yang et al. | |
| 2021/0124013 A1 | 4/2021 | Motoyama et al. | |
| 2021/0150747 A1* | 5/2021 | Liu | G06T 5/50 |
| 2022/0222849 A1* | 7/2022 | Zhang | G06T 7/74 |

FOREIGN PATENT DOCUMENTS

| | | |
|---|---|---|
| JP | 2019-15606 A | 1/2019 |
| JP | 6533619 B2 | 6/2019 |
| WO | WO 2013/145072 A1 | 10/2013 |
| WO | WO 2017/057041 A1 | 4/2017 |
| WO | WO 2019/155719 A1 | 8/2019 |

OTHER PUBLICATIONS

Ishikawa et al., "LiDAR and Camera Calibration using Motion Estimated by Sensor Fusion Odometry", Apr. 14, 2018, Total 8 pages.

* cited by examiner

DATA PROCESSING APPARATUS, DATA PROCESSING METHOD, AND COMPUTER READABLE MEDIUM

CROSS REFERENCE TO RELATED APPLICATION

This application is a Continuation of PCT International Application No. PCT/JP2021/008985, filed on Mar. 8, 2021, which is hereby expressly incorporated by reference into the present application.

TECHNICAL FIELD

The present disclosure relates to automatic calibration.

BACKGROUND ART

A plurality of sensors is installed on a moving body, for recognizing a surrounding environment. For example, a vehicle which is one of moving bodies, is equipped with a photographic device such camera and with a three-dimensional sensor such as a Light Detection and Ranging (LiDAR) as sensors. It is possible to recognize the surrounding environment of the vehicle by integrating detection results of the plurality of sensors.

In order to accurately integrate the detection results of the sensors, it is necessary to calculate a relative position and a relative pose between the sensors in advance. Automatically calculating the relative position and the relative pose between the sensors mentioned above is referred to as automatic calibration.

Patent Literature 1 discloses a technique for improving accuracy of the automatic calibration. More, specifically, Patent Literature 1, among three-dimensional point groups acquired by the LiDAR, larger weight (reliability) is applied to a three-dimensional point group that is closer to the camera, and smaller weight (reliability) is applied to a three-dimensional point group that is farther from the camera. By doing so, the accuracy of the automatic calibration improves in Patent Literature 1.

CITATION LIST

Patent Literature

Patent Literature 1: WO 2019/155719 A1

SUMMARY OF INVENTION

Technical Problem

There are an appearance-based method and a motion-based method in methods of the automatic calibration.

In the appearance-based method, edge information on an image photographed by the camera and three-dimensional point group data from the LiDAR are superimposed. Then, the calibration is performed by detecting a deviation amount between the edge information and the three-dimensional point group data. In the appearance-based method, the calibration is possible even if the moving body is travelling, but on the other hand, robustness is low because it depends on the surrounding environment in which the moving body is travelling.

The motion-based method can reduce the problem of the low robustness. In the motion-based method, a movement amount calculated from photographed image data from the camera is compared with a movement amount calculated from the three-dimensional point group data from the LiDAR. Then, the calibration is performed based on the comparison of the movement amounts, and a relative position and a relative pose between the camera and the LiDAR are calculated. Since the relative position and the relative pose between the camera and the LiDAR do not change even if the moving body moves, it is possible to calculate the relative position and the relative pose between the camera and the LiDAR by comparing the movement amounts.

In general, scale of the movement amount calculated from the photographed image data from the camera is unknown. Further, accuracy in detecting an image feature point based on the photographed image data from the camera tends to be low, compared with that based on the three-dimensional point group data from the LiDAR, and thus the photographed image data from the camera may include a large error.

As described above, in the motion-based method, if the accuracy based on the photographed image data from the camera is low, there is a problem in that an accurate calibration operation cannot be performed and the accurate relative position and the accurate relative pose cannot be calculated.

The present disclosure mainly aims to solve such a problem. More specifically, a main purpose of the present disclosure is to enable an accurate calibration operation using photographed image data from a camera, and to calculate air accurate relative position and an accurate relative pose.

Solution to Problem

A data processing apparatus according to the present disclosure includes:
a first movement amount acquisition unit to acquire as a first movement amount, an estimated movement amount of a moving body calculated using photographed image data acquired by a photographic device installed on the moving body;
a second movement amount acquisition unit to acquire in synchronization with the acquisition of the first movement amount by the first movement amount acquisition unit, as a second movement amount, an estimated movement amount of the moving body with higher estimation accuracy than estimation accuracy of the first movement amount; and
a comparison decision unit to compare the first movement amount with the second movement amount, and decide to use the first movement amount for a calibration operation when difference between the first movement amount and the second movement amount is less than a threshold value.

Advantageous Effects of Invention

According to the present disclosure, it is possible to perform an accurate calibration operation using photographed image data from a camera, and therefore, it is possible to calculate air accurate relative position and an accurate relative pose.

DESCRIPTION OF EMBODIMENTS

Embodiments will be described hereinafter reference to the drawings. In the following description of the embodiments and the drawings, portions denoted by the same reference signs indicate the same or corresponding portions.

Embodiment 1

Description of Configuration

Figure 1:
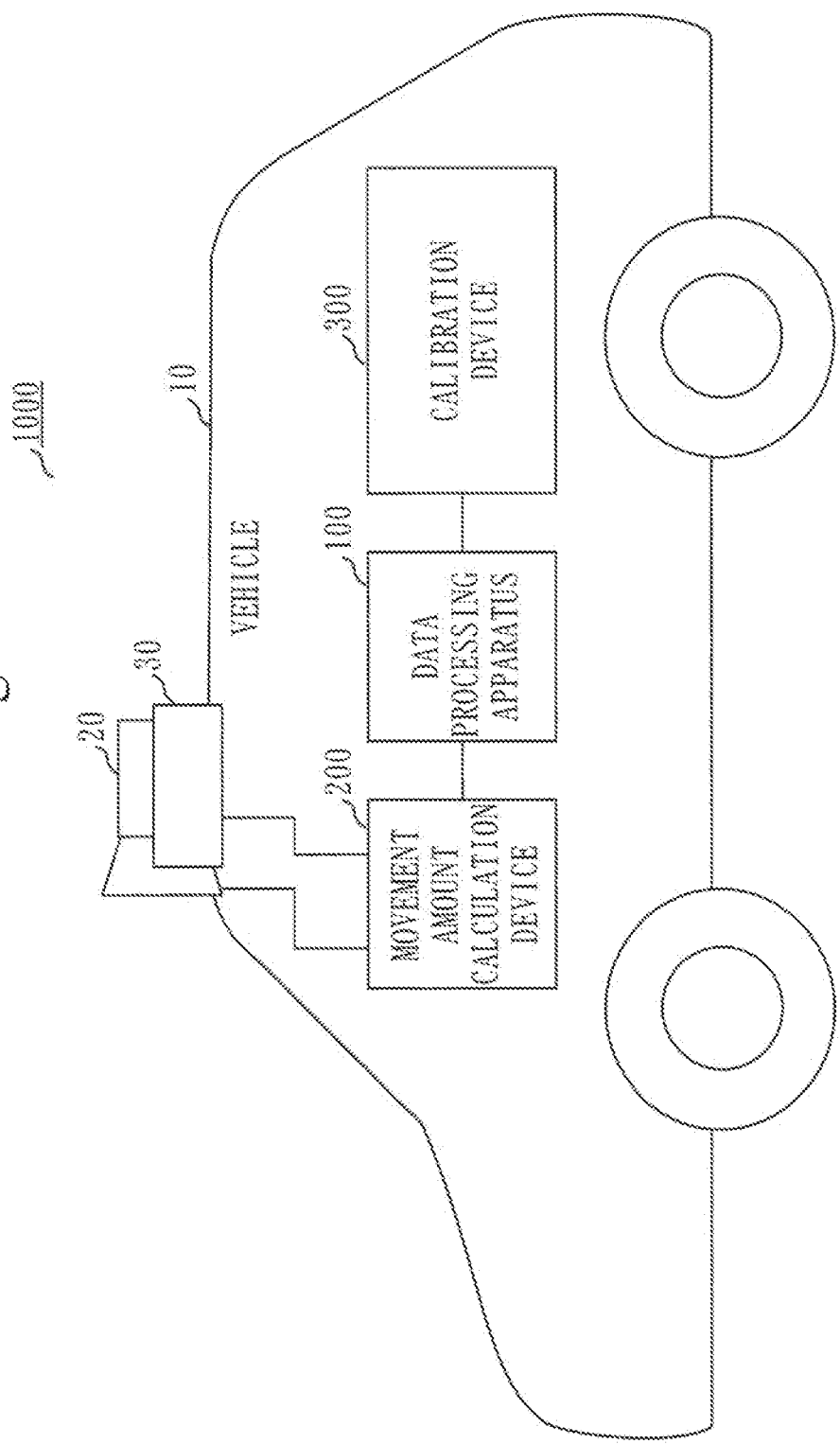
FIG. 1 is a diagram illustrating a configuration example of a calibration system according to Embodiment 1.
Figure 2:
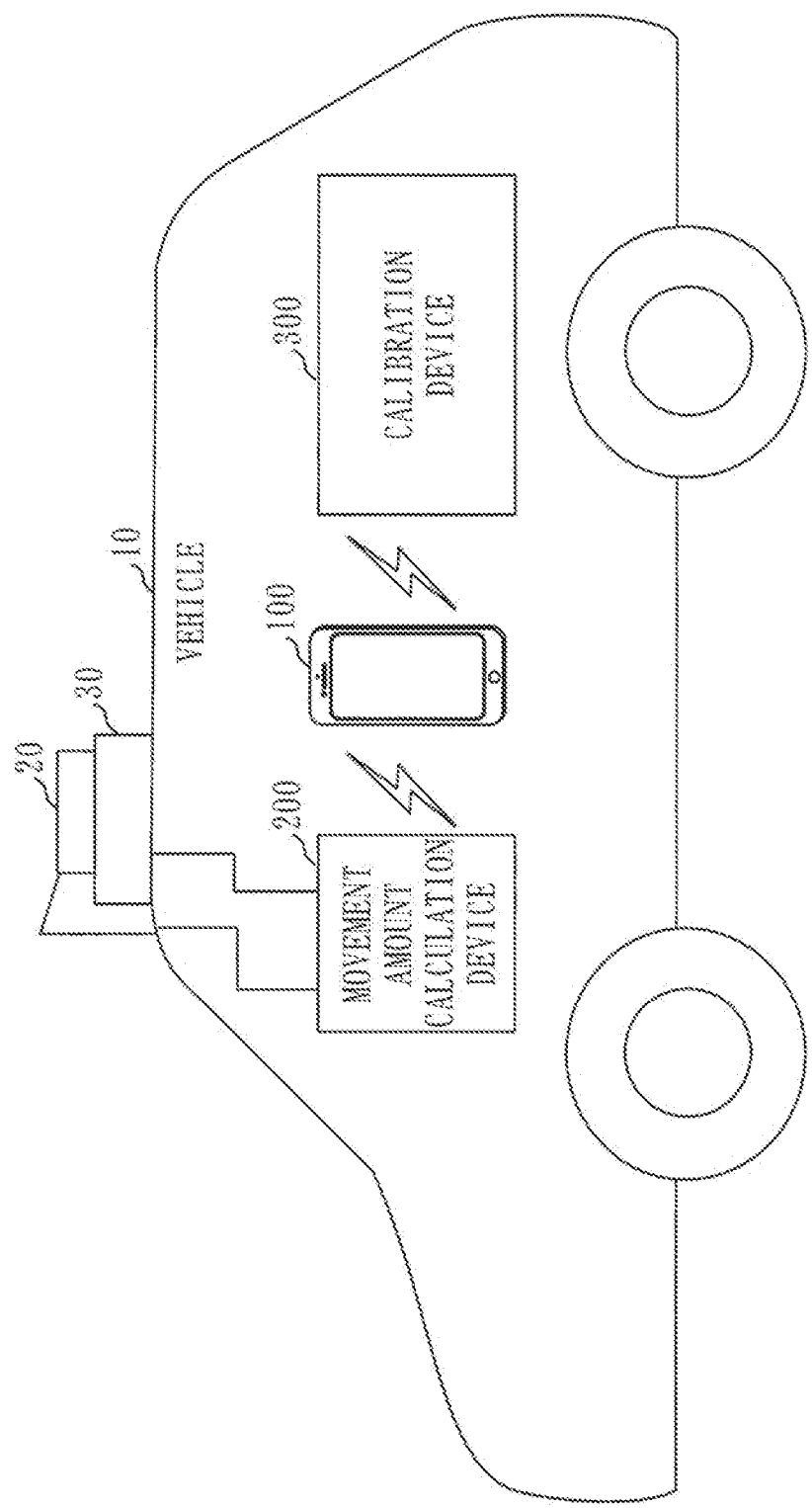
FIG. 2 is a diagram illustrating another configuration example of the calibration system according to Embodiment 1.
Figure 3:
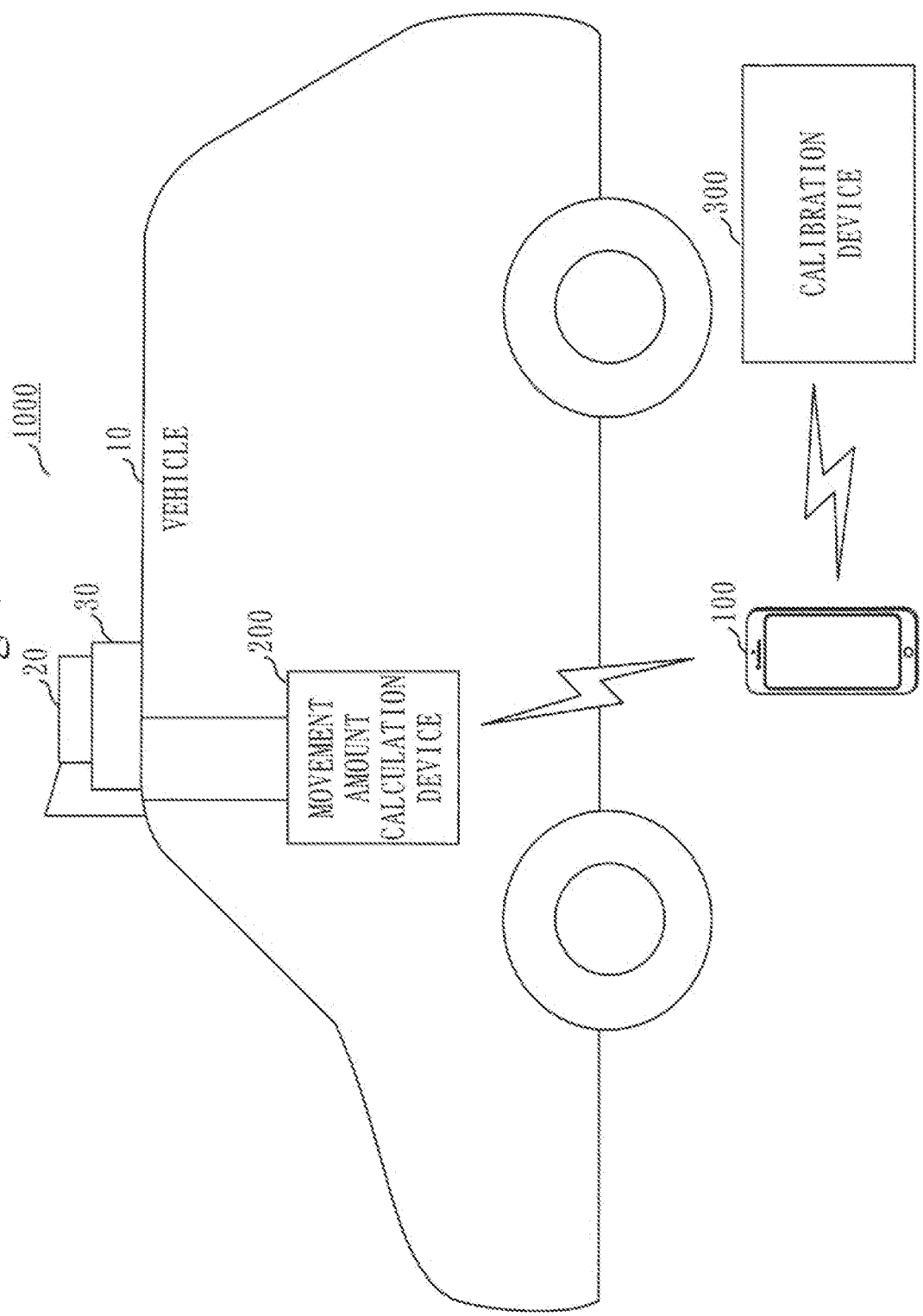
FIG. 3 diagram illustrating another configuration example of the calibration system according to Embodiment 1.

Each of FIGS. 1, 2, and 3 illustrates a configuration example of a calibration system 1000 according to the present embodiment.

The calibration system 1000 is configured with a camera 20, a LiDAR 30, a data processing apparatus 100, a movement amount calculation device 200, and a calibration device 300.

In FIG. 1, each of the camera 20, the LiDAR 30, the data processing apparatus 100 the movement amount calculation device 200, and the calibration device 300 is installed on a vehicle 10. In the configuration of FIG. 1, the data processing apparatus 100, the movement amount calculation device 200, and the calibration device 300 are connected, for example, by wire.

In FIG. 2, the data processing apparatus 100 is a mobile terminal device such as a smartphone. Therefore, in the configuration of FIG. 2, the data processing apparatus 100 may be used inside the vehicle 10 or may be used outside the vehicle 10. In the configuration of FIG. 2, the data processing apparatus 100 is wirelessly connected to the movement amount calculation device 200 and the calibration device 300.

In FIG. 3, the data processing apparatus 100 and the calibration ice 300 are placed outside the vehicle 10. In the configuration of FIG. 3 as well, the data processing apparatus 100 is a mobile terminal device such as a smartphone. Although the data processing apparatus 100 is placed outside the vehicle 10 in FIG. 3, the data processing apparatus 100 may be used inside the vehicle 10. In the configuration of FIG. 3 as well, the data processing apparatus 100 is wirelessly connected to the movement amount calculation device 200 and the calibration device 300.

In the following, the description will proceed based on the configuration of FIG. 1, but the following description is applied also to the configurations of FIGS. 2 and 3 by appropriately reading it according to the configurations of FIGS. 2 and 3.

In FIG. 1, the camera 20 is installed on the vehicle 10 and acquires photographed image data by photographing a surrounding environment of the vehicle 10 at a constant photographic cycle as the vehicle 10 travels. For example, the camera 20 performs the photographing at the cycle of 50 milliseconds. The photographed image data acquired by the photographing is output to the movement amount calculation device 200.

The camera 20 is an example of a photographic device.

The LiDAR 30 is also installed on the vehicle 10 and acquires three-dimensional point group data by imaging a surrounding environment of the vehicle 10 as the vehicle 10 travels. The LiDAR 30 images the surrounding environment of the vehicle 10 in synchronization with the camera 20 (at an imaging cycle which is the same cycle as the photographic cycle of the camera 20). For example, the LiDAR 30 performs the imaging the cycle of 50 milliseconds. The three-dimensional point group data acquired by the imaging is output to the movement amount calculation device 200.

The LiDAR 30 is an example of a three-dimensional sensor. Further, the three-dimensional point group data acquired by the LiDAR 30 is an example of three-dimensional sensor data.

The installation positions of the camera 20 and the LiDAR 30 illustrated in FIGS. 1 to 3 are examples, and the camera 20 and the LiDAR 30 may be installed at different positions from the positions illustrated in FIGS. 1 to 3.

The movement amount calculation device 200 acquires the photographed image data from the camera 20. Then, the movement amount calculation device 200 calculates an estimated movement amount of the vehicle 10 using the photographed image data. It is assumed that the estimated movement amount calculated by the movement amount calculation device 200 includes an estimated amount of rotational movement (an estimated rotational amount) of the vehicle 10 around a rotational vector of the camera 20.

In the following, the estimated movement amount of the vehicle 10 calculated using the photographed image data is referred to as a camera movement amount 110. The camera movement amount 110 is equivalent to a first movement amount.

By comparing the photographed image data acquired in a current photographic cycle with the photographed image data acquired in a previous photographic cycle, the movement amount calculation device 200 calculates the camera movement amount 110 which is the estimated movement amount of the vehicle 10 in the photographic cycle (for example, 50 milliseconds).

The movement amount calculation device 200, specifically, calculates the camera movement amount 110 by Visual-Simultaneous Localization and Mapping (SLAM) using a correspondence relation between time-series images.

Further, the movement amount calculation device 200 acquires the three-dimensional point group data from the LiDAR 30. Then, the movement amount calculation device 200 calculates an estimated movement amount of the vehicle 10 using the three-dimensional point group data. It is assumed that the estimated movement amount calculated by the movement amount calculation device 200 includes an estimated amount of rotational movement (an estimated rotational amount) of the vehicle 10 around a rotational vector of the LiDAR 30.

In the following, the estimated movement amount of the vehicle 10 calculated using the three-dimensional point group data is referred to as a LiDAR movement amount 120. The LiDAR movement amount 120 has higher estimation accuracy than that of the camera movement amount 110. The LiDAR movement amount 120 is equivalent to a second movement amount.

By comparing the three-dimensional point group data acquired in a current photographic cycle with the three-dimensional point group data acquired in a previous photographic cycle, the movement amount calculation device 200 calculates the LiDAR movement amount 120 which is the estimated movement amount of the vehicle 10 in the photographic cycle (for example, 50 milliseconds). Specifically, the movement amount calculation device 200 calculates the LiDAR movement amount 120 by LiDAR-SLAM using an Iterative Closest Point (ICP) algorithm.

The movement amount calculation device 200 outputs to the data processing apparatus 100, the calculated camera movement amount 110 and the calculated LiDAR movement amount 120.

Further, the movement amount calculation device 200 also outputs an Identifier (ID) of the photographed image data to the data processing apparatus 100. The ID of the photographed image data is hereinafter referred to as a photographed mage data ID 130.

The data processing apparatus 100 acquires the camera movement amount 110 and the LiDAR movement amount 120 from the movement amount calculation device 200. Further, the data processing apparatus 100 also acquires the photographed image data ID 130 from the movement amount calculation device 200.

The data processing apparatus 100 compares the camera movement amount 110 with the LiDAR movement amount 120, and determines whether or not the camera movement amount 110 is suitable for a calibration operation in the calibration device 300 to be described below. When the camera movement amount 110 is suitable for the calibration operation, the data processing apparatus 100 decides to use the camera movement amount 110 for the calibration operation. Then, the data processing apparatus 100 outputs to the calibration device 300, the camera movement amount 110, the LiDAR movement amount 120, and the photographed image data ID 130.

The calibration device 300 performs the calibration operation by a motion-based method using the camera movement amount 110, the LiDAR movement amount 120, the photographed image data specified by the photographed image data ID 130, and the three-dimensional point group data acquired at the same time as the photographed image data.

The calibration device 300 is able to calculate a relative position and a relative pose between the camera 20 and the LiDAR 30 using the calibration operation. It is assumed that the calibration device 300 acquires, for example, from the movement amount calculation device 200, the photographed image data specified by the photographed image data ID 130, and the three-dimensional point group data acquired at the same time as the photographed image data.

The calibration device 300 mainly performs the following as the calibration operation.

First, the calibration device 300 roughly aligns coordinate systems of the camera 20 and the LiDAR 30, and performs 2D to 3D matching. The 2D to 3D matching is a process searching for a correspondence between image feature point group detected from the photographed image data from the camera 20 and a three-dimensional point group of the three-dimensional point group data front the LiDAR 30.

Figure 4:
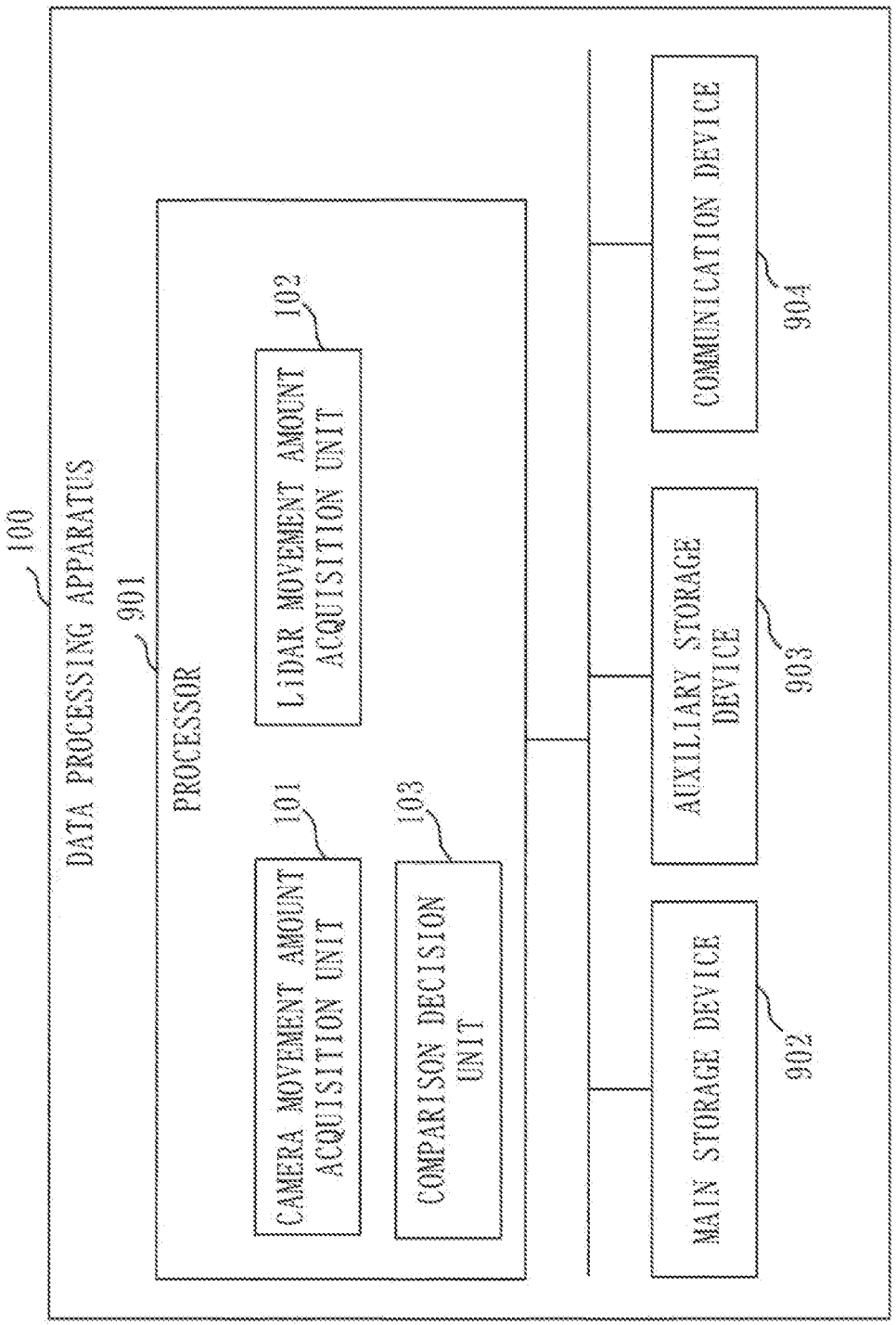
FIG. 4 is a diagram illustrating a hardware configuration example of a data processing apparatus according to Embodiment 1.

FIG. 4 illustrates a hardware configuration example of the data processing apparatus 100 according to the present embodiment.

Figure 5:
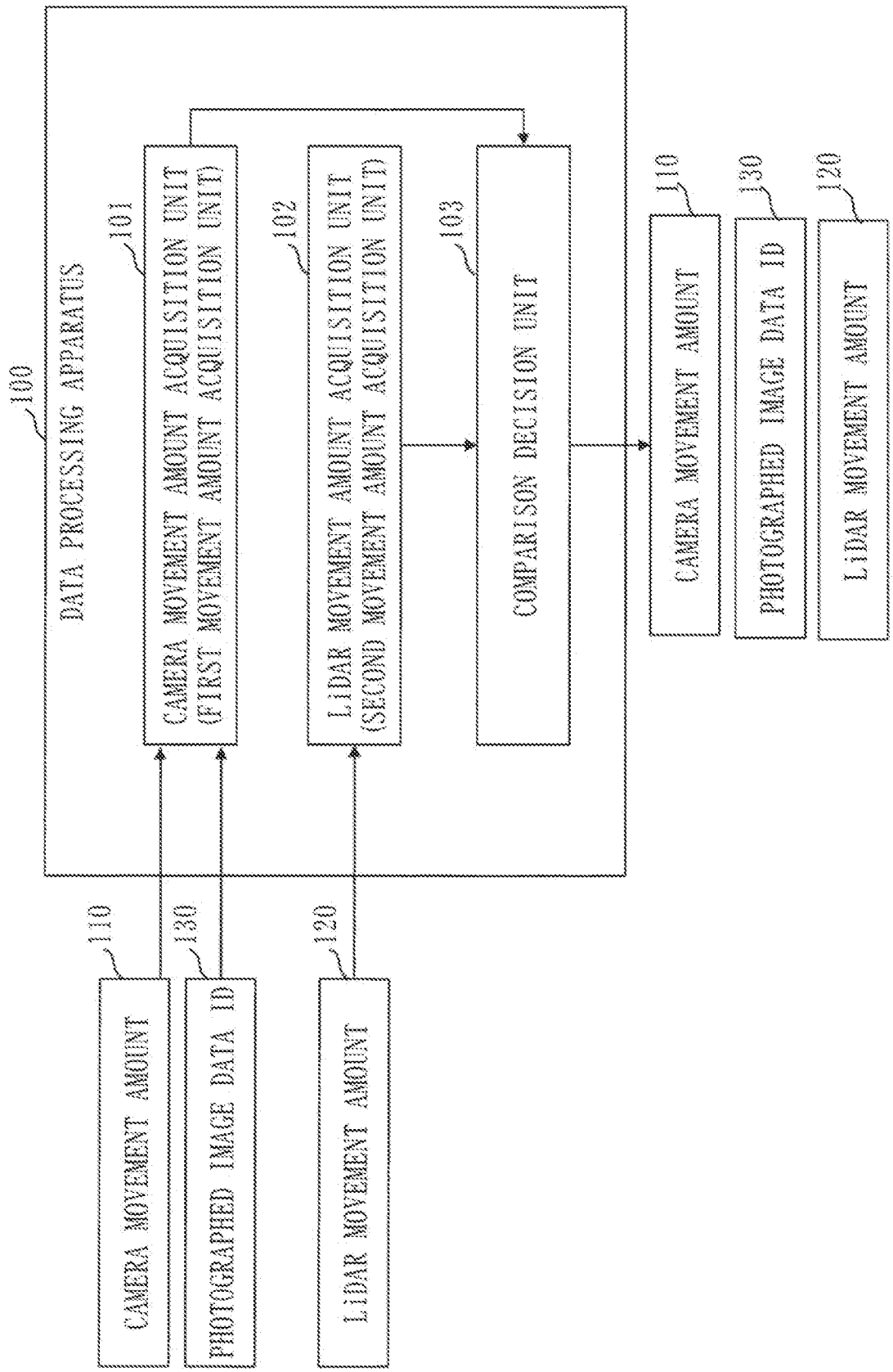
FIG. 5 is a diagram illustrating a functional configuration example of the data processing apparatus according to Embodiment 1.

FIG. 5 illustrates a functional configuration example of the data processing apparatus 100 according to the present embodiment.

First, the hardware configuration example of the data processing apparatus 100 will be described with reference to FIG. 4.

The data processing apparatus 100 according to the present embodiment is a computer.

An operation procedure of the data processing apparatus 100 is equivalent to a data processing method. Further, a program that implements operation of the data processing apparatus 100 is equivalent to a data processing program.

The data processing apparatus 100 includes a processor 901, a main storage device 902, an auxiliary storage device 903, and a communication device 904 as pieces of hardware.

Further, as illustrated in FIG. 5, the data processing apparatus 100 includes a camera movement amount acquisition 101, a LiDAR movement amount acquisition unit 102, and a comparison decision unit 103, as functional configurations.

The auxiliary storage device 903 stores program that implement functions of the camera movement amount acquisition unit 101, the LiDAR movement amount acquisition unit 102, and the comparison decision unit 103.

These programs are loaded from the auxiliary storage device 903 into the main storage device 902. Then, the processor 901 executes these programs and performs operation of the camera movement amount acquisition unit 101, the LiDAR movement amount acquisition unit 102, and the comparison decision unit 103 to be described below.

FIG. 3 schematically illustrates a state in which the processor 901 executes the programs that implement the functions of the camera movement amount acquisition unit 101, the LiDAR movement amount acquisition unit 102, and the comparison decision unit 103.

The communication device 904 communicates with the movement amount calculation device 200 and the calibration device 300.

Next, the functional configuration example of the data processing apparatus 100 according to the present embodiment will be described with reference to FIG. 5.

The camera movement amount acquisition unit 101 acquires from the movement amount calculation device 200, the camera movement amount 110 and the photographed image data ID 130. The camera movement amount acquisition unit 101 outputs to the comparison decision unit 103, the acquired the camera movement amount 110 and the acquired photographed image data ID 130.

The camera movement amount acquisition unit 101 is equivalent to a first movement amount acquisition unit. Further, a process performed by the camera movement amount acquisition unit 101 is equivalent to a first movement amount acquisition process.

The movement amount acquisition unit 102 acquires the LiDAR movement amount 120 from the movement amount calculation device 200. The LiDAR movement amount acquisition unit 102 outputs the acquired LiDAR movement amount 120 to the comparison decision unit 103.

The LiDAR movement amount acquisition unit 102 is equivalent to a second movement amount acquisition unit. Further, a process performed by the LiDAR movement amount acquisition unit 102 is equivalent to a second movement amount acquisition process.

The comparison decision unit 103 compares the camera movement amount 110 with the LiDAR movement amount 120, and decides to use the camera movement amount 110 for the calibration operation in the calibration device 300 when a difference between the camera movement amount 110 and the LiDAR movement amount 120 is less than a threshold value.

Then, the comparison decision unit 103 outputs to the calibration device 300, the camera movement amount 110, the LiDAR movement amount 120, and the photographed image data ID 130.

A process performed by the comparison decision unit 103 is equivalent to a comparison decision process.

Description of Operation

Next, an operation example of the data processing apparatus 100 according to the present embodiment will be described with reference to FIG. 6.

Figure 6:
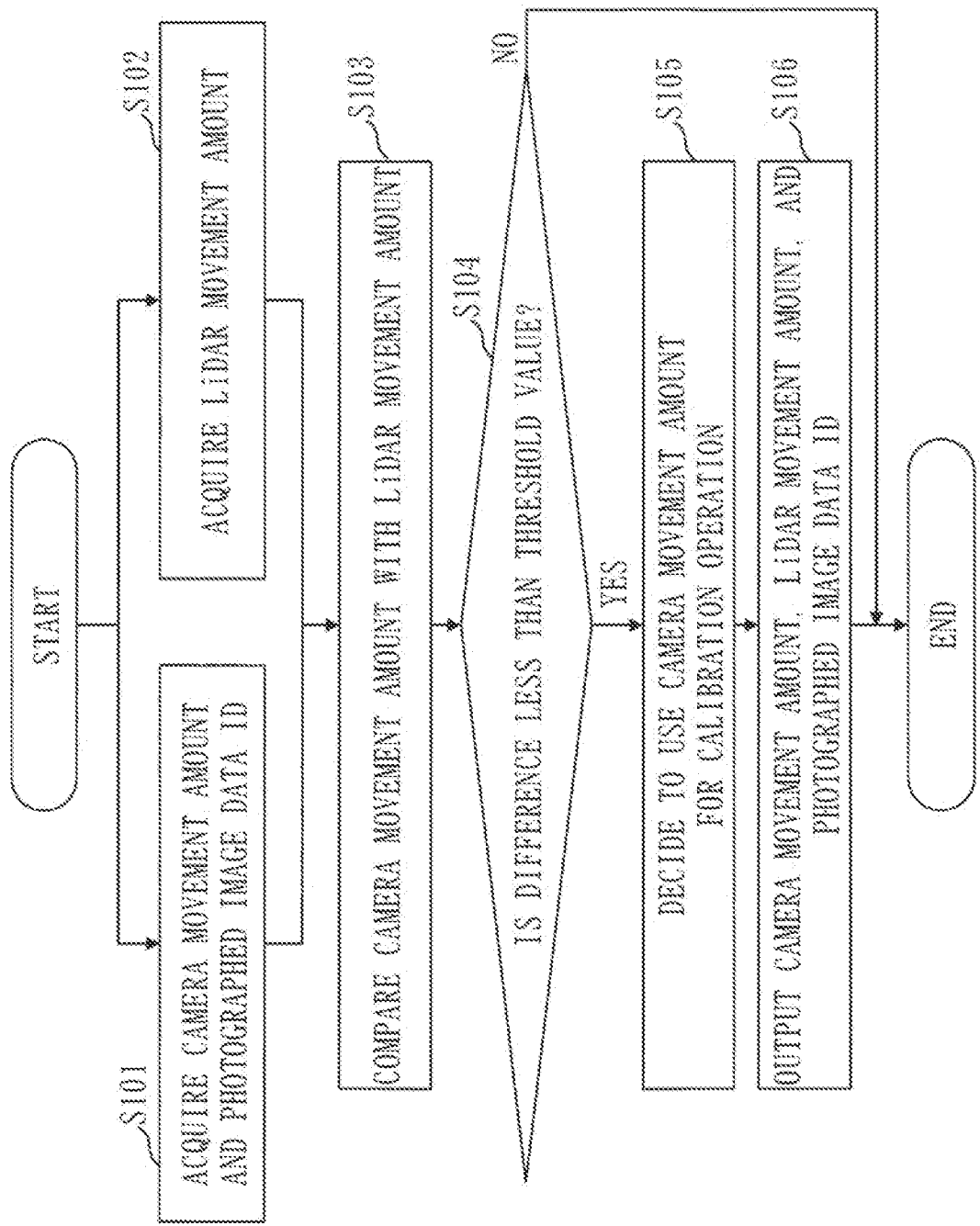
FIG. 6 is a flowchart illustrating an operation example of the data processing apparatus according to Embodiment 1.

The data processing apparatus 100 repeats the operation illustrated in FIG. 6 every time when the photographic cycle and the imaging cycle arrive.

In step S101, the camera movement amount acquisition unit 101 acquires the camera movement amount 110 and the photographed image data ID 130. The camera movement amount acquisition unit 101 outputs to the comparison decision unit 103, the acquired camera movement a count 110 and the acquired photographed image data ID 130.

Further at the same time in step S102, the LiDAR movement amount acquisition unit 102 acquires the LiDAR movement amount 120. The LiDAR movement amount acquisition unit 102 outputs the acquired LiDAR movement amount 120 to the comparison decision unit 103.

Next, step S103, the comparison decision unit 103 compares the camera movement amount 110 with the LiDAR movement amount 120.

Specifically, the comparison decision unit 103 compares the estimated rotational amount included in the camera movement amount 110 with the estimated rotational amount included in the LiDAR movement amount 120.

The camera 20 and the LiDAR 30 have the same rotational movement amount around the rotational vector during the rotational movement. Further, the estimated rotational amount of the LiDAR 30 is more accurate than the estimated rotational amount of the camera 20. Therefore, the comparison decision unit 103 compares the estimated rotational amount included in the camera movement amount 110 with the estimated rotational amount included in the LiDAR movement amount 120, using the LiDAR movement amount 120 as a correct value.

When the difference between the camera movement amount 110 and the LiDAR movement amount 120 is less than the threshold value (YES in step S104), the process proceed to step S105. On the other hand, when the difference between the camera movement amount 110 and the LiDAR movement amount 120 is equal to or greater than the threshold value (NO in step S104), the process ends.

In step S105, the comparison decision unit 103 decides to use the camera movement amount 110 for the calibration operation.

That is, when the difference between the camera movement amount 110 and the LiDAR movement amount 120 is small, it is considered that accuracy of the camera movement amount 110 is high, so that the comparison decision unit 103 decides to use the camera movement amount 110 for the calibration operation.

Then, in step S106, the comparison decision unit 103 outputs to the calibration device 300, the camera movement amount 110, the LiDAR movement amount 120, and the photographed image data ID 130.

The calibration device 300 acquires the camera movement amount 110, the LiDAR movement as count 120, and the photographed image data ID 130.

Then the calibration device 300 outputs the photographed image data ID 130 to the movement amount calculation device 200. The movement amount calculation device 200 outputs to the calibration device 300, the photographed image data specified by the photographed image data ID 130 acquired from the calibration device 300, and the three-dimensional point group data imaged at the same tinge as the photographed image data.

Next, the calibration device 300 performs the following calibration operation using the motion-based method.

(1) The calibration device 300 calculates from the cam movement amount 110 and the LiDAR movement amount 120, the relative position the relative pose between the camera 20 and the LiDAR 30. However, since these relative position and relative pose include errors, the calibration device 300 corrects the errors by the following 2D to 3D matching.

(2) The calibration device 300 performs coordinate transformation using the calculated relative position and relative pose including the errors, and matches the coordinate system of the camera 20 with coordinate system of the LiDAR 30.

(3) Next, the calibration device 300 draws a straight line that connects a coordinate origin and a feature point in photographed image data. The photographed image data is acquired from the movement amount calculation device 200.

(4) Further, the calibration device 300 generates a three-dimensional shape (a polygon surface or the like) from the three-dimensional point group measured by the LiDAR 30.

(5) Next, the calibration device 300 obtains an intersection point between the three-dimensional shape and the straight line that connects the coordinate origin and the feature point. This intersection point is referred to as a 2D to 3D correspondence point.

(6) Furthermore, the calibration device 300 converts the feature point in the photographed image data from two-dimensional coordinate information to three-dimensional coordinate information, using the 2D to 3D correspondence point.

(7) In addition, the calibration device 300 calculates the estimated movement amount of the camera 20, from the three-dimensional coordinate information obtained by the conversion.

(8) Then, the calibration device 300 calculates from the estimated movement amount of the camera 20 calculated in the above (7) and the LiDAR movement amount 120, the relative position and the relative pose between the camera 20 and the LiDAR 30.

(9) Next, the calibration device 300 evaluates a change amount between the relative position and the relative pose obtained in the process of (8), and the relative position and the relative pose obtained in the process of (1).

When the change mount is equal to or greater than a threshold value, the calibration device 300 performs the processes of (2) to (8) again using, the relative position and the relative pose calculated in the process of (8) since the relative position and the relative pose with higher accuracy may be calculated. On the other hand, when the change amount is less than the threshold value, the calibration device 300 outputs the relative position and the relative pose obtained in the process of (8).

(10) When the above processes of (2) to (8) are performed again, the calibration device 300 evaluates a change amount between the relative position and the relative pose obtained in the process of the last (8), and the relative position and the relative pose obtained in the process of the previous (8).

When the change amount is equal to or greater than the threshold value, the calibration device 300 performs the processes of (2) to (8) again using the relative position and the relative pose calculated in the process of (8) since the relative position and the relative pose with higher accuracy may be calculated. On the other hand, when the change amount is less than the threshold value, the calibration device 300 outputs the relative position and the relative pose obtained in the process of (8).

In this way, the calibration device 300 is able to gradually improve the accuracy of the relative position and the relative pose by repeating the processes of (2) (8).

Description of Effect of Embodiment

In the present embodiment, the data processing apparatus 100 selects the camera movement amount 110 with high accuracy by comparing the camera movement amount 110 with the LiDAR movement amount 120. Then, the calibration device 300 performs the calibration operation using the camera movement amount 110 selected by the data processing apparatus 100. Therefore, according to the present embodiment, it is possible to perform the accurate calibration operation using the camera movement amount 110, and therefore, it is possible to calculate the accurate relative position and the accurate relative pose.

When accuracy of the estimated movement amount of the camera 20 input by the calibration device 300 is low, as error of the 2D to 3D corresponding point is large. Therefore, even if the calibration device 300 repeats the processes (2) to (8), is of the relative position and the relative pose do not converge, and calculation accuracy of the relative position and the relative pose does not improve.

In the present embodiment, the camera movement amount 110 with high accuracy can be used, so that it is possible to calculate the relative position and the relative pose high accuracy by the calibration device 300 repeating the processes of (2) to (8).

In the above description, the vehicle 10 is used as an example of the moving body. However, the above description is also applicable to other moving bodies such as a ship, an aircraft, a helicopter, a drone, and a person.

Further, in the above description, the LiDAR 30 is used as an example of the three-dimensional sensor. Other types of sensors such as a millimeter wave sensor and a sonar used as a three-dimensional sensor instead of the LiDAR 30.

Further, in the above, the data processing apparatus 100 outputs the photographed image data ID 130 to the calibration device 300, and the calibration device 300 acquires from the movement amount calculation device 200, the photographed image data and the three-dimensional point group data, based on the photographed image data ID 130. The movement amount calculation device 200 may output to the data processing apparatus 100, the photographed image data and the three-dimensional point group data instead of the photographed image data ID 130, and when the data processing apparatus 100 decides to use the camera movement amount 110 for the calibration operation, the data processing apparatus 100 may output to the calibration device 300, the camera movement amount 110, the LiDAR movement amount 120, the photographed image data, and the three-dimensional point group data.

Embodiment 2

In the present embodiment, differences from Embodiment 1 will be mainly described.

Matters not described below are the same as those in Embodiment 1.

Description Configuration

Figure 7:
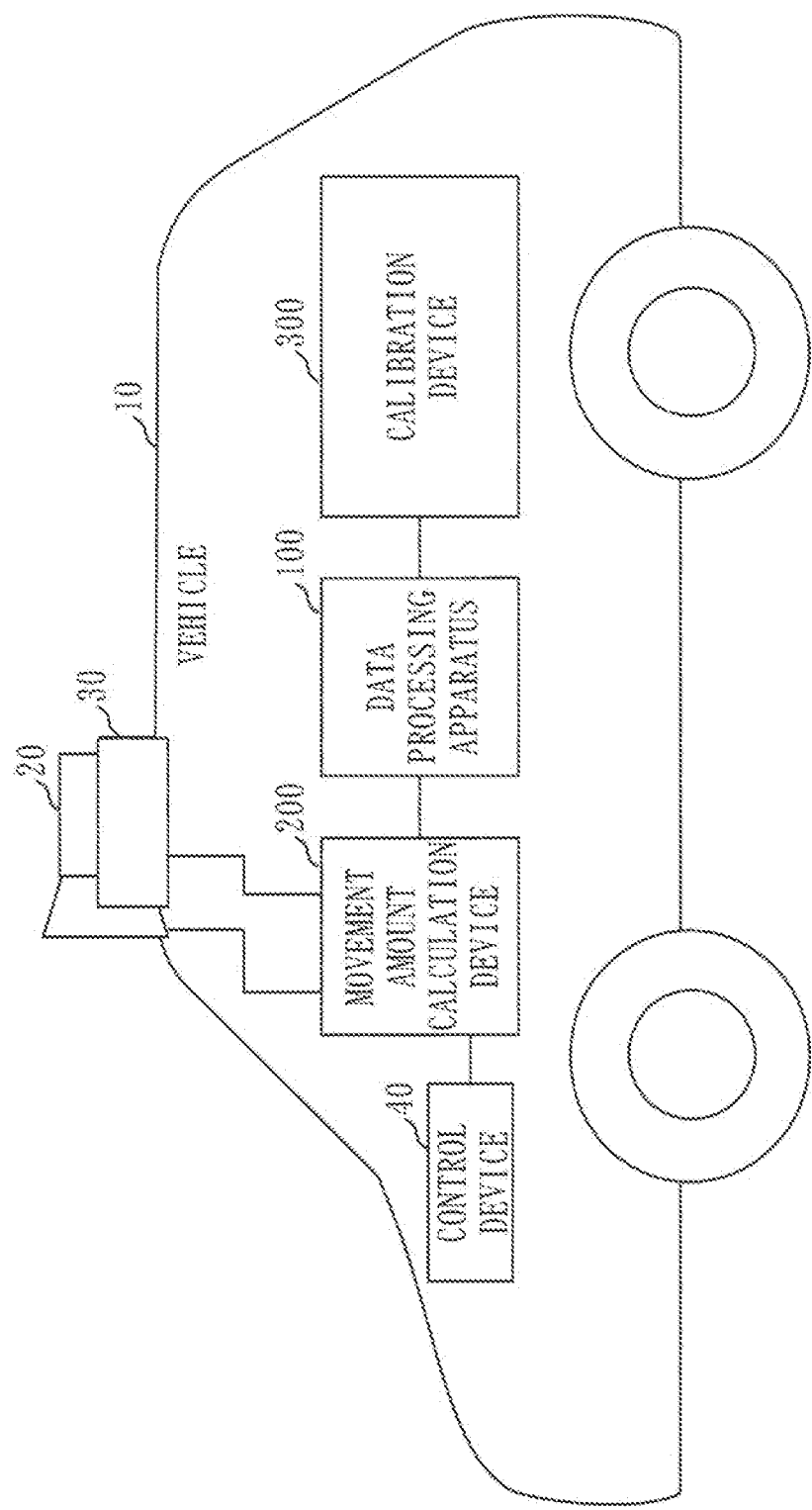
FIG. 7 is a diagram illustrating a functional configuration example of the calibration system according to Embodiment 2.

FIG. 7 illustrates a configuration example of the calibration system 1000 according to the present embodiment.

Compared with FIG. 1, a control device 40 is added in FIG. 7.

The control device 40 controls the vehicle 10. While controlling the vehicle 10, the control device 40 measures a speed and a traveling direction angle of the vehicle 10 in synchronization with the camera 20 (at a measurement cycle which is the same cycle as the photographic cycle of the camera 20). Then, the control device 40 outputs to the movement amount calculation device 200, measurement values of the speed and the traveling direction angle.

In the present embodiment, the movement amount calculation device 200 calculates an estimated movement amount of the vehicle 10 in the measurement cycle (for example, 50 milliseconds), using the measurement values of the speed and the traveling direction angle acquired from the control device 40. In the following, the estimated movement amount of the vehicle 10 calculated using the measurement values of the speed and the traveling direction angle is referred to as a measurement value movement amount 140. Estimation accuracy of the measurement value movement amount 140 is higher than that of the camera movement amount 110. It is assumed that the measurement value movement amount 140 also includes an estimated rotational amount.

In the present embodiment, the measurement value movement amount 140 is equivalent to a second movement amount.

In the present embodiment, the data processing apparatus 100 acquires from the movement amount calculation device 200, the camera movement amount 110, the LiDAR movement amount 120, the photographed image data ID 130, and the measurement value movement amount 140.

The data processing apparatus 100 compares the camera movement amount 110 with the measurement value movement amount 140, and determines whether or not the camera movement amount 110 is suitable for the calibration operation in the calibration device 300. When the camera movement amount 110 is suitable for the calibration operation, the data processing apparatus 100 decides that the camera movement amount 110 is used for the calibration operation. Then, the data processing apparatus 100 outputs to the calibration device 300, the camera movement amount 110, the LiDAR movement amount 10, and the photographed image data ID 130.

The calibration device 300 is the same as the calibration device 300 described in Embodiment 1.

The calibration system 1000 according to the present embodiment may be implemented by configurations in which the control device 40 is added to FIGS. 2 and 3.

In the following, the description will proceed based on the configuration of FIG. 7, but the following description is applied also to the configurations of FIGS. 2 and 3 to which the control device 40 is added, by appropriately reading it according to the configurations of FIGS. 2 and 3.

Figure 8:
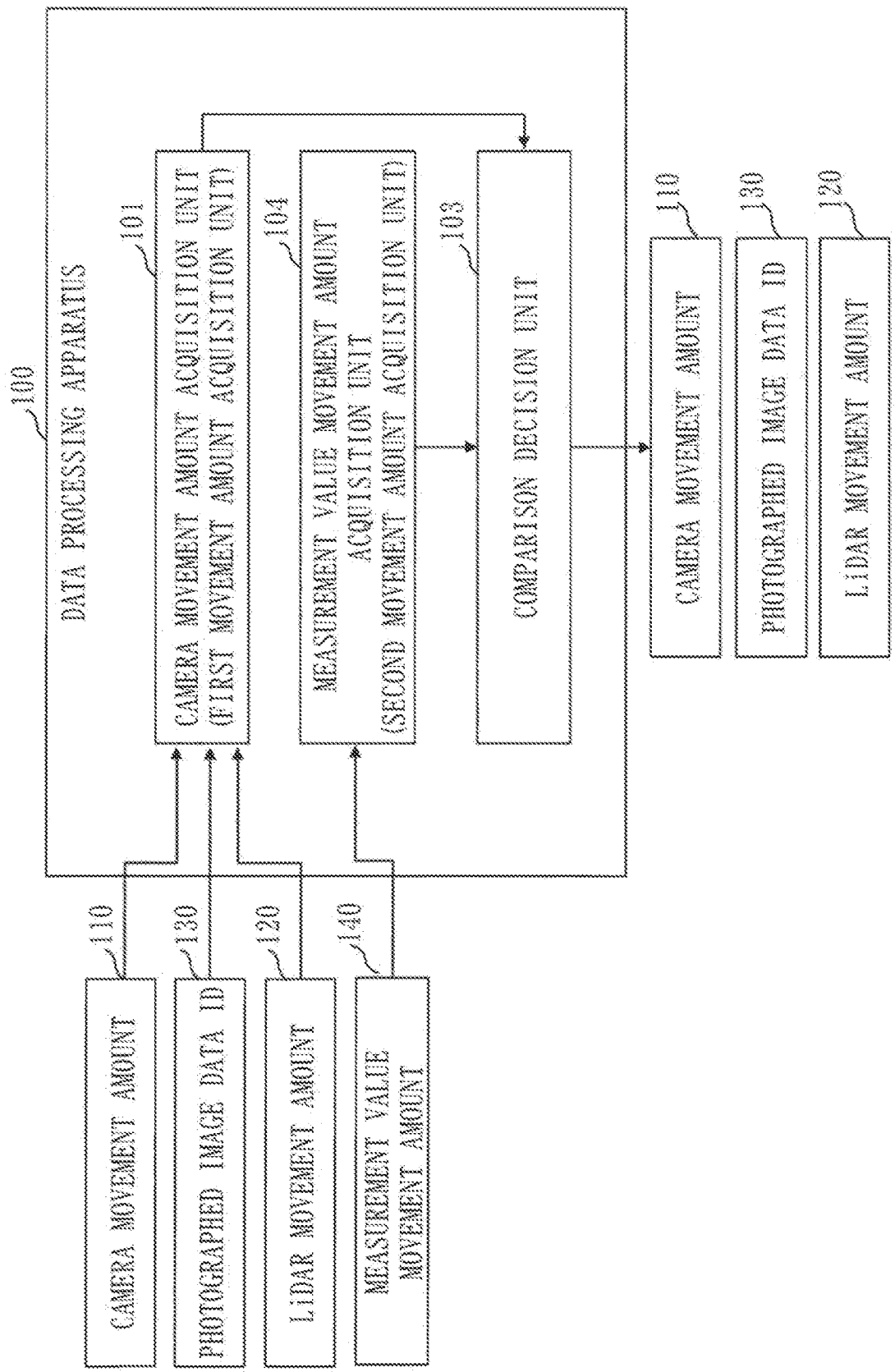
FIG. 8 is a diagram illustrating a functional configuration example of the data processing apparatus according to Embodiment 2.

FIG. 8 illustrates a functional configuration example of the data processing apparatus 100 according to the present embodiment.

The data processing apparatus 100 illustrated in FIG. 8 includes a measurement value movement amount acquisition unit 104 instead of the LiDAR movement amount acquisition unit 102 illustrated in FIG. 5.

The measurement value movement amount acquisition unit 104 acquires the measurement value movement amount 140 from the movement amount calculation device 200. The measure movement value movement amount acquisition unit 104 outputs the acquired measurement value movement amount 140 to the comparison decision unit 103.

In the present embodiment, the measurement value movement amount acquisition unit 104 is equivalent to a second movement amount acquisition unit. Further, a process performed by the measurement value movement amount acquisition unit 104 is equivalent to a second movement amount acquisition process.

In the present embodiment, the camera movement amount acquisition unit 101 acquires the camera movement amount 110, the LiDAR movement amount 120, and the photographed image data ID 130. The camera movement amount acquisition unit 101 outputs to the comparison decision unit 103, the acquired camera movement amount 110, the acquired LiDAR movement amount 120, and the acquired photographed image data ID 130.

The comparison decision unit 103 compares the camera movement amount 110 with the measurement value movement amount 140, and when a difference between the camera movement amount 110 and the measurement value movement amount 140 is less than a threshold value, the Comparison decision unit 103 decides to use the camera movement amount 110 for the calibration operation in the calibration device 300.

Then, the comparison decision unit 103 outputs to the calibration device 300, the camera movement amount 110, the LiDAR movement amount 120, and the photographed image data ID 130.

Description of Operation

Next, an operation example of the data processing apparatus 100 according to the present embodiment 1 be described with reference to FIG. 9.

Figure 9:
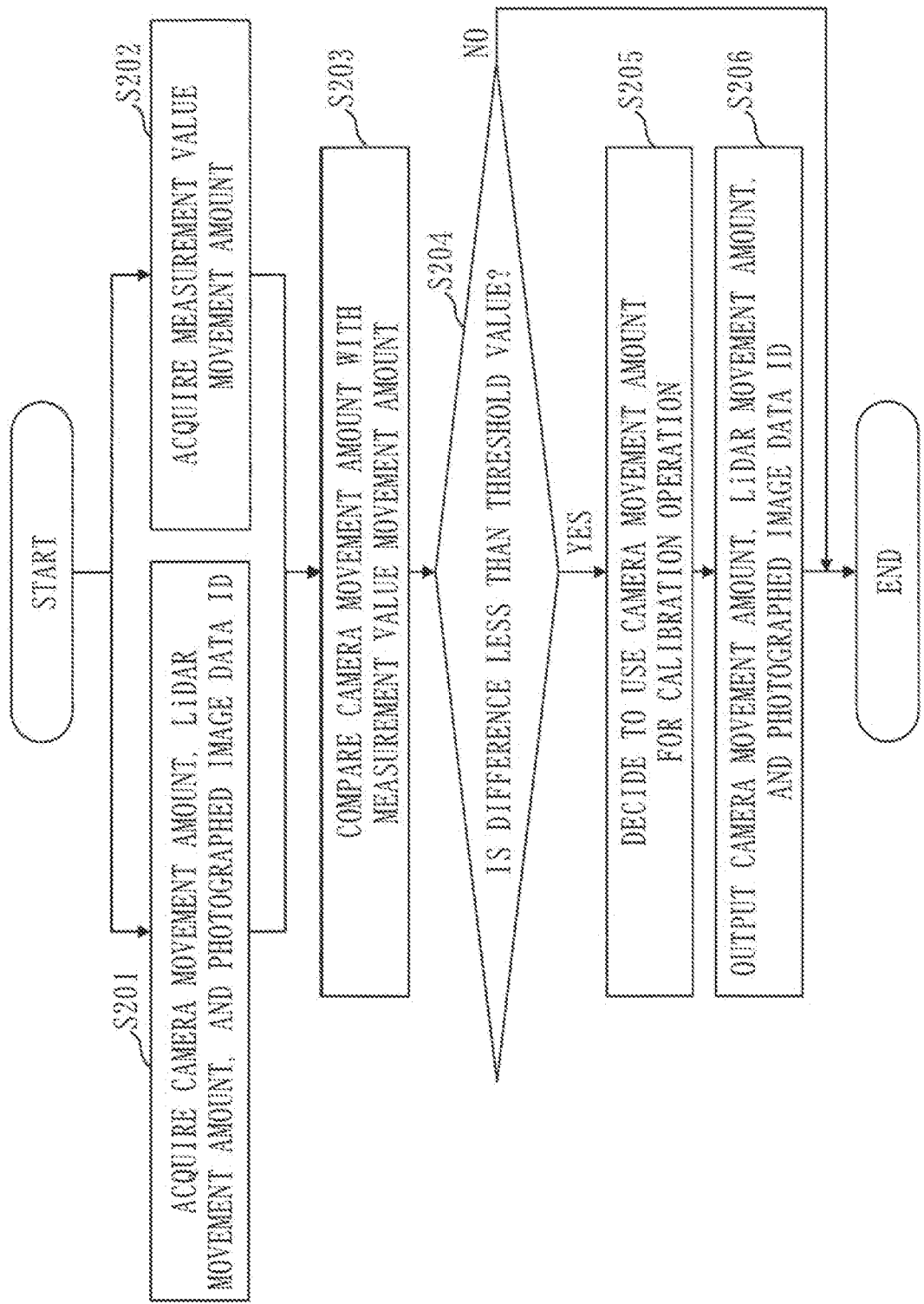
FIG. 9 is a flowchart illustrating an operation example of the data processing apparatus according to Embodiment 2.

The data processing apparatus 100 repeats the operation illustrated in FIG. 9 every time when the photographic cycle, the imaging cycle, and a measurement cycle arrive.

In step S201, the camera movement amount acquisition unit 101 acquires the camera movement amount 110, the LiDAR movement amount 120, and the photographed image data ID 130. The camera movement amount acquisition unit 101 outputs to the comparison decision unit 103, the acquired camera movement amount 110, the acquired LiDAR movement amount 120, and the acquired photographed image data ID 130.

Further, at the same time in step S202, the measurement value movement amount acquisition unit 104 acquires the measurement value movement amount 140. The measurement value movement amount acquisition unit 104 outputs the acquired measurement value movement amount 140 to the comparison decision unit 103.

Next, in step S203, the comparison decision unit 103 compares the camera movement amount 110 with the measurement value movement amount 140. More specifically, the comparison decision unit 103 compares an estimated rotational amount included in the camera movement amount 110 with an estimated rotational amount included in the measurement value movement amount 140.

When the difference between the camera movement amount 110 and the measurement value movement amount 140 is less than the threshold value (YES in step S204), the process proceeds to step S205. On the other hand, when the difference between the camera movement amount 110 and the measurement value movement amount 140 is equal to or greater thank the threshold value (NO in step S204), the process ends.

In step S205, the comparison decision unit 103 decides to use the camera movement amount 110 for calibration operation.

That is, when the difference between the camera movement amount 110 and the measurement value movement amount 140 is small, it is considered that accuracy of the camera movement amount 110 is high, so that the comparison decision unit 103 decides to use the camera movement amount 110 for the calibration operation.

Then, in step S206, the comparison decision unit 103 outputs to the calibration device 300, the camera movement amount 110, the LiDAR movement amount 120, and the photographed image data ID 130.

Since operation of the calibration device 300 is the same as that in Embodiment 1, the description of the operation of the calibration device 300 will be omitted.

The hardware configuration example of the data processing apparatus 100 is as illustrated in FIG. 4. In the present embodiment, instead of a program that implements a function the LiDAR movement amount acquisition unit 102, a program that implements a function of the measurement value movement amount acquisition unit 104 is executed by the processor 901.

Description of Effect of Embodiment

According to the present embodiment, as with Embodiment 1, it is possible to calculate the accurate relative position and the accurate relative pose even using the measurement value move amount 140.

Embodiment 3

In the present embodiment, differences from Embodiment 1 will be main described.

Matters not described below are the same as those in Embodiment 1.

In the present embodiment; the data processing apparatus 100 selects from among a plurality of camera movement amounts 110 whose difference from the LiDAR movement amount 120 is less than a threshold value, the camera movement amount 110 to be used for the calibration operation.

A hardware configuration example and a functional configuration of the data processing apparatus 100 according to the present embodiment are as illustrated in FIGS. 4 and 5.

Figure 10:
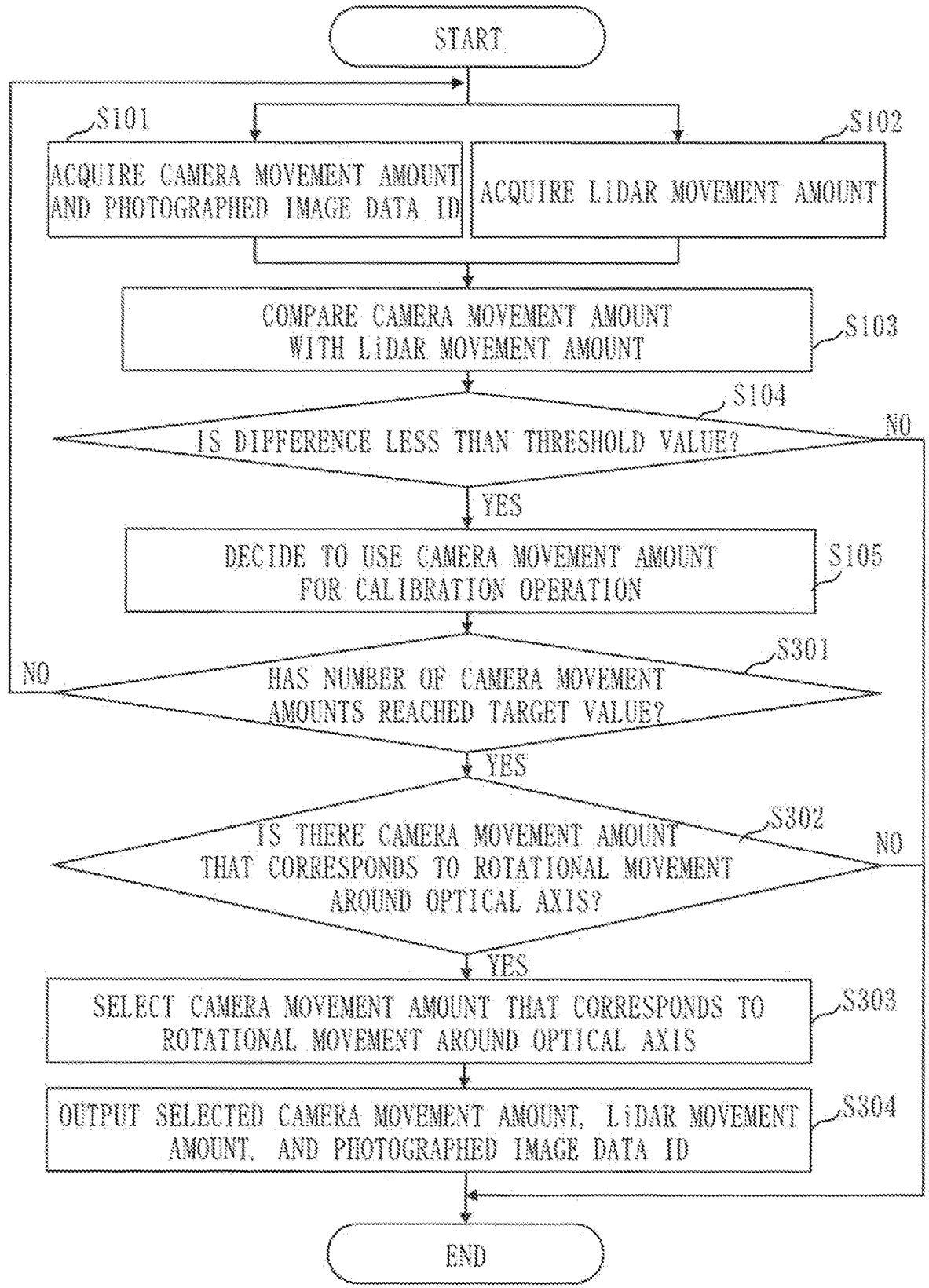
FIG. 10 is a flowchart illustrating an operation example of the data processing apparatus according to Embodiment 3.

Next, an operation example of the data processing apparatus 1 according to the present embodiment will be described with reference to FIG. 10.

Since steps S101 to S105 are the same as those illustrated in FIG. 6, the description thereof is omitted.

In the present embodiment, even if the comparison decision unit 103 decides to use the camera movement amount 110 for the calibration operation, the comparison decision unit 103 does not output the camera movement amount 110 to the calibration device 300. The comparison decision unit 103, for example, stores into the auxiliary storage device 903, the camera movement amount 110, the LiDAR movement amount 120, and the photographed image data ID 130 while associating them with each other.

In step S301, the comparison decision unit 103 determines whether or not the number of camera movement amounts 110 decided be used for the calibration operation has reached a predetermined target value. The target value is any number which is equal to or greater than 2.

When the number of camera movement amounts 110 decided to be used for the calibration operation has reached the target value, the process proceeds to step S302. On the other hand, when the number of camera movement amounts 110 decided to be used for the calibration operation has not reached the target value, the comparison decision unit 103 waits for the camera movement amount acquisition unit 101 to acquire the camera movement amount 110 and the photographed image data ID 130, and waits for the LiDAR movement amount acquisition unit 102 to acquire the LiDAR movement amount 120.

In step S302, the comparison decision unit 103 determines whether or not there is the camera movement amount 110 that corresponds to rotational movement around an optical axis of the camera 20, among the camera movement amounts 110 decided to be used for the calibration operation.

When there is the camera movement amount 110 that corresponds to the rotational movement around the optical axis of the camera 20, among the camera movement amounts 110 decided to be used for the calibration operation, the process proceeds to step S303. On the other hand, when there is no camera movement amount 110 that corresponds to the rotational movement around the optical axis of the camera 20, among the camera movement amounts 110 decided to be used for the calibration operation, the process ends.

In step S303, the comparisons decision unit 103 selects the camera movement amount 110 that corresponds to the rotational movement around the optical axis of the camera 20, as a subject to the calibration operation. That is, the data processing apparatus 100 selects the camera movement amount 110 is which translational movement components are few, as the subject to the calibration operation.

A translation vector included in the camera movement amount 110 is less effective in reducing a calibration error. That is, the translation vector included in the camera movement amount 110 does not contribute to an improvement of accuracy of the 2D to 3D matching. On the other hand, the camera movement amount 110 that corresponds to the rotational movement around the optical axis of the camera 20 is able to improve calibration accuracy.

Therefore the comparison decision unit 103 selects the camera movement amount 110 that corresponds to the rotational movement around the optical axis of the camera 20, as the subject to the calibration operation.

Specifically, it is conceivable that the comparison decision unit 103 compares ratios of lengths of translation vectors of the camera movement amounts 110, and selects the predetermined number of camera movement amounts 110 in each direction of roll, pitch, and yaw, in ascending order of the translation vectors.

Next, in step S304, the comparison decision unit 103 outputs to the calibration device 300, the camera movement amount 110 selected in step S303 and the LiDAR movement amount 120 and the photographed image data ID 130 associated with the camera movement amount 110.

In the present embodiment, the data processing apparatus 100 selects the camera movement amount 110 that improves the calibration accuracy, and outputs the selected camera movement amount 110 to the calibration device 300. Therefore, it is possible to calculate the relative position and the relative pose higher accuracy than those in Embodiment 1.

In the present embodiment, it has been described that the data processing apparatus 100 compares the camera movement amount 110 with the LiDAR movement amount 10 as with Embodiment 1, but the data processing apparatus 100 may compare the camera movement amount 110 with the measurement value movement amount 140 as with Embodiment 2.

Embodiment 4

In the present embodiment, differences from Embodiment 1 will be mainly described.

Matters not described below are the same as those in Embodiment 1.

In the present embodiment, the vehicle 10 is an Automatic Guided Vehicle (AGV) which is small mobility.

When impact sensor or the like detects a displacement of installation positions of the camera 20 and/or the LiDAR 30, the AGV detects a space (hereinafter referred to as a calibration space) required for automatic calibration. Then, the calibration device 300 installed on the AGV performs the calibration operation using the camera movement amount 110 and the LiDAR movement amount 120 obtained by travelling in the calibration space, to enable to quickly correct the displacement of the installation positions.

In the a automatic calibration, the camera movement amount 110 and the LiDAR movement amount 120 during rotational movement are important. Therefore, it is preferable for the AGV to travel a circular course involving the rotational movement in the calibration space. In this regard, the AGV is good at making a small turn during travelling, compared with a large vehicle.

In the present embodiment, it is assumed that the AG travels one round around circular course. That is, the AGV sets any position on the circular course as a travel start position, and returns at the travel start position after travelling one round around the circular course. By returning the AGV to the travel start position, it is possible to evaluate calculation accuracy of the camera movement amount 110 calculated from the photographed image data of the camera 20. In this evaluation, it is conceivable to generate a movement trajectory of the AGV from the camera movement amount 110, and to evaluate whether or not an end position of the movement trajectory is accurately returned to the travel start position.

Further, in the present embodiment, the movement amount calculation device 200 determines whether or not travel start photographed image data is consistent with travel end photographed image data. The travel start photographed image data is photographed image data acquired by the camera 20 at a time when the AGV starts travelling from the travel start position of the circular course. Further, the travel end photographed image data is photographed image data acquired by the camera 20 at a time when it is determined that the AGV has returned to the travel start position after travelling one round around the circular course and the travelling is ended. When the travel start photographed image data and the travel end photographed image data are consistent, the movement amount calculation device 200 calculates as the camera movement amount 110, an estimated movement amount of the AGV using any photographed image data among a plurality of pieces of photographed image data acquired by the camera 20 while the AGV travels one round around the circular course.

In this case, an ID tag functioning as a mark may be placed at the travel start position. By placing the mark such as the ID tag at the travel start position, it is easy to compare the travel start photographed image data with the travel end photographed image data. Alternatively, a charge facility of the AGV may be set as the travel start position.

Alternatively, the calibration space may be searched for in advance before the AGV travels, and position information on the calibration space obtained as a result of the search may be stored into the AGV.

Embodiments 1 and 4 have been described above and two or more of these embodiments may be implemented in combination.

Alternatively, one of these embodiments may be partially implemented.

Alternatively, two or more of these embodiments may be partially implemented in combination.

Further, the configurations and procedures described in these embodiments may be modified as necessary.

Supplementary Description of Hardware Configuration

Finally, a supplementary description of the hardware configuration of the data processing apparatus 100 will be given.

The processor 901 illustrated in FIG. 4 is an Integrated Circuit (IC) that performs processing.

The processor 901 is a Central Processing Unit (CPU), a Digital Signal Processor (DSP), or the like.

The main storage device 902 illustrated in FIG. 4 is a Random Access Memory (RAM).

The auxiliary storage device 903 illustrated in FIG. 4 is a Read Only Memory (ROM), a flash memory, a Hard Disk Drive (HDD), or the like.

The communication device 904 illustrated in FIG. 4 is an electronic circuit that executes a communication process for data.

The communication device 904 is, for example, a communication chip or a Network Interface Card (NIC).

Further, the auxiliary storage device 903 also stores an Operating System (OS).

Then, at least a part of the OS is executed by the processor 901.

While executing at least the part of the OS, the processor 901 executes programs that implement functions of the camera movement amount acquisition unit 101, the LiDAR movement amount acquisition unit 102, the comparison decision unit 103, and the measurement value movement amount acquisition unit 104.

By the processor 901 executing the OS, task management, memory management, file management, communication control, and the like are performed.

Further, at least one of information, data, a signal value, and a variable value that indicate results of processes of the camera movement amount acquisition unit 101, the LiDAR movement amount acquisition unit 102, the comparison decision 103, and the measurement value movement amount acquisition unit 104 is stored in at least one of the main storage device 902, the auxiliary storage device 903, and a register and a cache memory in the processor 901.

Further, the programs that implement the functions of the camera movement amount acquisition unit 101, the LiDAR movement amount acquisition unit 102, the comparison decision unit 103, and the measurement value movement amount acquisition unit 104 may be stored in a portable recording medium such magnetic disk, a flexible disk, an optical disc, a compact disc, a Blu-ray (registered trademark) disc, or a DVD. Then the portable recording medium storing the programs that implement the functions of the camera movement amount acquisition unit 101, the LiDAR movement amount acquisition unit 102, the comparison decision unit 103, and the measurement value movement amount acquisition unit 104 may be distributed.

Further, the "unit" of each of the camera movement amount acquisition unit 101, the LiDAR movement amount acquisition unit 102, the comparison decision unit 103, and the measurement value movement amount acquisition unit 104 may be read as a "circuit", "step", "procedure", "process", or "circuitry".

Further, the data processing apparatus 100 may be implemented by a processing circuit. The processing circuit is, for example, a logic Integrated Circuit (IC), a Gate Array (GA), an Application Specific Integrated Circuit (ASIC), or a Field-Programmable Gate Array (FPGA).

In this case, each of the camera movement amount acquisition unit 101, the LiDAR movement amount acquisition unit 102, the comparison decision unit 103, and the measurement value movement amount acquisition unit 104 is implemented as a part of the processing circuit.

In the present description, a superordinate concept of the processor and the processing circuit is referred to as "processing circuitry".

That is, each of the processor e processing circuit is a specific example of the "processing circuitry".

REFERENCE SIGNS LIST

10: vehicle; 20: camera; 30: LiDAR; 40: control device; 100: data processing apparatus; 101: camera movement amount acquisition unit; 102: LiDAR movement amount acquisition unit; 103: comparison decision unit; 104: measurement value movement amount acquisition unit; 110: camera movement amount; 120: LiDAR movement amount; 130: photographed image data ID; 140: measurement value movement amount; 200: movement amount calculation device; 300: calibration device; 901: processor; 902: main storage device; 903: auxiliary storage device; 904: communication device; 1000; calibration system

The invention claimed is:

1. A data processing apparatus comprising:
processing circuitry:
to acquire as a first movement amount, an estimated movement amount of a moving body calculated using photographed image data acquired by a photographic device installed on the moving body, said photographic device corresponding to a first type of imaging;
to acquire in synchronization with the acquisition of the first movement amount, as a second movement amount, an estimated movement amount of the moving body with higher estimation accuracy than estimation accuracy of the first movement amount; and
to compare the first movement amount with the second movement amount, and decide to use the first movement amount for a calibration operation associated with a coordinate system of a second type of imaging when a difference between the first movement amount and the second movement amount is less than a threshold value.

2. The data processing apparatus according to claim 1, wherein
the processing circuitry acquires as the second movement amount, an estimated movement amount of the moving body calculated using three-dimensional sensor data acquired by a three-dimensional sensor installed on the moving body, said three-dimensional sensor performing the second type of imaging, said second type of imaging having higher estimation accuracy than the first type of imaging.

3. The data processing apparatus according to claim 2, wherein the processing circuitry acquires the first movement amount that includes an estimated rotational amount of the moving body calculated using the photographed image data, acquires the second movement amount that includes an estimated rotational amount of the moving body calculated using the there-dimensional sensor data, and compares the estimated rotational amount of the moving body included in the first movement amount with the estimated rotational amount of the moving body included in the second movement amount, and decides to use the first movement amount for the calibration operation when a difference between the estimated rotational amount of the moving body included in the first movement amount and the estimated rotational amount of the moving body included in the second movement amount is less than a threshold value.

4. The data processing apparatus according to claim 1, wherein the processing circuitry acquires as the second movement amount, an estimated movement amount of the moving body calculated using a measurement value measured by a control device installed on the moving body.

5. The data processing apparatus according to claim 1, wherein the processing circuitry repeats the acquisition of the first movement amount, repeats the acquisition of the second movement amount, repeats the comparison of the first movement amount with the second movement amount every time when the acquisition of the first movement amount and the acquisition of the second movement amount are performed, and as a result of repeating the comparison of the first movement amount with the second movement amount, when there is a plurality of the first movement amounts decided to be used for the calibration operation, selects from among the plurality of the first moving amounts, a first movement amount that corresponds to rotational movement around an optical axis of the photographic device.

6. The data processing apparatus according to claim 1, wherein when the difference between the first movement amount and the second movement amount is less than the threshold value, the processing circuitry decides to use the first movement amount for the calibration operation using a motion-based method for calculating a relative position and a relative pose between a three-dimensional sensor installed on the moving body and the photographic device.

7. The data processing apparatus according to claim 1, wherein the moving body is an Automatic Guided Vehicle (AGV), the processing circuitry is connected to a movement amount calculation device that calculates the first movement amount and acquires the first movement amount calculated by the movement amount calculation device, and the movement amount calculation device determines whether or not travel start photographed image data and travel end photographed image data are consistent, where the travel start photographed image data is the photographed image data acquired by the photographic device at a time point when the AGV starts travelling from a travel start position of a circular course, and where the travel end photographed image data is the photographed image data acquired by the photographic device at a time point when it is determined that the AGV has returned to the travel start position after travelling one round around the circular course and the travelling is ended, and when the travel start photographed image data and the travel end photographed image data are consistent, calculates as the first movement amount, an estimated movement amount of the AGV using any of photographed image data among a plurality of pieces of photographed image data acquired by the photographic device while the AGV travels one round around the circular course.

8. A data processing method comprising:

acquiring as a first movement amount, an estimated movement amount of a moving body calculated using photographed image data acquired by a photographic device installed on the moving body, the photographic device corresponding to a first type of imaging;

acquiring in synchronization with the acquisition of the first movement amount, as a second movement amount, an estimated movement amount of the moving body with higher estimation accuracy than estimation accuracy of the first movement amount; and comparing the first movement amount with the second movement amount, and deciding to use the first movement amount for a calibration operation associated with a coordinate system of a second type of imaging when a difference between the first movement amount and the second movement amount is less than a threshold value.

9. A non-transitory computer readable medium storing a data processing program for causing a computer to execute:

a first movement amount acquisition process to acquire as a first movement amount, an estimated movement amount of a moving body calculated using photographed image data acquired by a photographic device installed on the moving body, the photographic device corresponding to a first type of imaging;

a second movement amount acquisition process to acquire in synchronization with the acquisition of the first movement amount by the first movement amount acquisition process, as a second movement amount, an estimated movement amount of the moving body with higher estimation accuracy than estimation accuracy of the first movement amount; and a comparison decision process to compare the first movement amount with the second movement amount, and decide to use the first movement amount for a calibration operation associated with a coordinate system of a second type of imaging when a difference between the first movement amount and the second movement amount is less than a threshold value.

10. The data processing method according to claim 8, wherein the second movement amount is acquired as an estimated movement amount of the moving body using three-dimensional sensor data acquired by a three-dimensional sensor installed on the moving body, the three-dimensional sensor performing the second type of imaging, the second type of imaging having higher estimation accuracy than the first type of imaging.

11. The non-transitory computer readable medium according to claim 9, wherein the second movement amount is acquired as an estimated movement amount of the moving body using three-dimensional sensor data acquired by a three-dimensional sensor installed on the moving body, the three-dimensional sensor performing the second type of imaging, the second type of imaging having higher estimation accuracy than the first type of imaging.

* * * * *